United States Patent
Liu et al.

(10) Patent No.: US 11,507,751 B2
(45) Date of Patent: Nov. 22, 2022

(54) COMMENT INFORMATION PROCESSING METHOD AND APPARATUS, AND MEDIUM

(71) Applicant: BEIJING BAIDU NETCOM SCIENCE AND TECHNOLOGY CO., LTD., Beijing (CN)

(72) Inventors: Hao Liu, Beijing (CN); Bolei He, Beijing (CN); Xinyan Xiao, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 192 days.

(21) Appl. No.: 16/938,355

(22) Filed: Jul. 24, 2020

(65) Prior Publication Data
US 2021/0200958 A1 Jul. 1, 2021

(30) Foreign Application Priority Data
Dec. 27, 2019 (CN) .......................... 201911380220.0

(51) Int. Cl.
*G06F 40/30* (2020.01)
*G06F 40/289* (2020.01)
(Continued)

(52) U.S. Cl.
CPC ............ *G06F 40/30* (2020.01); *G06F 40/242* (2020.01); *G06F 40/289* (2020.01); *G06N 3/0454* (2013.01); *G06N 3/088* (2013.01)

(58) Field of Classification Search
None
See application file for complete search history.

(56) References Cited

U.S. PATENT DOCUMENTS

| 9,990,356 B2 * | 6/2018 | Yoon ..................... G06F 40/242 |
| 2012/0101808 A1 * | 4/2012 | Duong-Van ............ G06F 40/30 704/9 |

(Continued)

FOREIGN PATENT DOCUMENTS

| CN | 108021609 A | 5/2018 |
| CN | 109002443 A | 12/2018 |

(Continued)

OTHER PUBLICATIONS

Chinese Patent Application No. 201911380220.0, English translation of First Office Action dated Aug. 27, 2020, 11 pages.

(Continued)

*Primary Examiner* — Douglas Godbold
(74) *Attorney, Agent, or Firm* — Lathrop GPM LLP

(57) ABSTRACT

The present disclosure discloses a comment information processing method and apparatus, and a medium. The specific implementation solution is: in response to a user operation, determining an opinion category corresponding to each opinion phrase in a comment opinion dictionary; obtaining a target corpus matching each opinion phrase from a plurality of comment corpora; for each opinion phrase, using a corresponding opinion category to label the target corpus matching each opinion phrase to obtain a first training sample; and training a classification model with the first training sample to identify the opinion category of a comment by using a trained classification model.

11 Claims, 3 Drawing Sheets

(51) Int. Cl.
*G06F 40/242* (2020.01)
*G06N 3/04* (2006.01)
*G06N 3/08* (2006.01)

(56) References Cited

U.S. PATENT DOCUMENTS

| | | | | |
|---|---|---|---|---|
| 2012/0259616 | A1* | 10/2012 | Peng | G06F 40/253 |
| | | | | 704/E11.001 |
| 2013/0311485 | A1* | 11/2013 | Khan | G06F 16/335 |
| | | | | 707/758 |
| 2016/0063993 | A1* | 3/2016 | Dolan | G06F 40/279 |
| | | | | 704/254 |
| 2016/0132900 | A1* | 5/2016 | Duggal | G06F 16/958 |
| | | | | 705/7.29 |
| 2017/0039036 | A1* | 2/2017 | Pillai | G06F 40/237 |
| 2017/0364797 | A1* | 12/2017 | Pal | G06N 3/08 |
| 2018/0032507 | A1* | 2/2018 | Mikhaylov | G06F 40/30 |
| 2018/0053107 | A1* | 2/2018 | Wang | G06N 3/084 |
| 2018/0246959 | A1* | 8/2018 | Iacus | G06F 16/353 |
| 2018/0260860 | A1* | 9/2018 | Devanathan | G06F 16/353 |
| 2018/0341839 | A1* | 11/2018 | Malak | G06V 30/2272 |
| 2018/0375896 | A1* | 12/2018 | Wang | G06F 16/9535 |
| 2019/0050875 | A1* | 2/2019 | McCord | G06F 40/30 |
| 2019/0197105 | A1* | 6/2019 | Tagra | G06F 40/30 |
| 2019/0220515 | A1* | 7/2019 | Aharoni | G06F 16/2465 |
| 2020/0065716 | A1* | 2/2020 | Aharonov | G06F 17/18 |
| 2020/0167418 | A1* | 5/2020 | He | G06N 3/0454 |
| 2020/0257762 | A1* | 8/2020 | Eskamani | G06N 20/00 |
| 2020/0285662 | A1* | 9/2020 | Chatterjee | G06N 3/049 |
| 2020/0311414 | A1* | 10/2020 | Enuka | G06V 30/418 |
| 2020/0327191 | A1* | 10/2020 | Lev-Tov | G06F 40/284 |
| 2020/0349183 | A1* | 11/2020 | Jayaraman | G06N 5/04 |
| 2020/0349229 | A1* | 11/2020 | Abudalfa | G06N 7/005 |
| 2020/0349529 | A1* | 11/2020 | Wang | G06F 40/284 |
| 2020/0356724 | A1* | 11/2020 | Li | G06F 40/30 |
| 2021/0097237 | A1* | 4/2021 | Saito | G06F 40/51 |
| 2021/0109994 | A1* | 4/2021 | Sengupta | G06N 5/04 |

FOREIGN PATENT DOCUMENTS

| | | |
|---|---|---|
| CN | 109800418 A | 5/2019 |
| CN | 109902273 A | 6/2019 |
| JP | 2009217642 A | 5/2019 |
| JP | 2004157841 A | 6/2019 |

OTHER PUBLICATIONS

Chinese Patent Application No. 201911380220.0, First Office Action dated Aug. 27, 2020, 10 pages.
"Collecting Evaluative Expressions by A Text Mining Technique", Information Processing Society of Japan, Mar. 6, 2003, vol. 2003, No. 23, 10 pages.
Japanese Patent Application No. 2020-127189, Office Action dated Sep. 28, 2021, 4 pages.
Japanese Patent Application No. 2020-127189, English translation of Office Action dated Sep. 28, 2021, 4 pages.

* cited by examiner

COMMENT INFORMATION PROCESSING METHOD AND APPARATUS, AND MEDIUM

CROSS-REFERENCE TO RELATED APPLICATION

The present application is based upon and claims priority to Chinese Patent Application No. 201911380220.0, filed on Dec. 27, 2019, the entire contents of which are incorporated herein by reference.

FIELD

The present disclosure relates to a field of natural language processing technologies in a field of computer technologies, and more particularly, to a comment information processing method and apparatus, and a medium.

BACKGROUND

With the rapid development of e-commerce, more and more users purchase products through e-commerce platforms. When users view a product on an e-commerce platform, they usually refer to comment information left by users who have purchased the product to determine the quality of the product based on the comment information. Consequently, comment information of products is of great significance to assist users in making consumption decisions and to help merchants improve service quality. However, with an explosive growth of data volume, users need to obtain useful information from massive comment data.

In the related art, processing of the comment data may include sub-tasks such as comment opinion extraction, opinion-level sentiment classification, and opinion classification. For the task of opinion extraction, a method based on supervised sequence labeling is used to extract comment opinions from the comment information. The user needs to label positions where the comment opinions appear in original comments, and to train a supervised sequence labeling model sequentially. For the task of opinion classification, the user needs to label a customized opinion classification system, which leads to a fact that opinion classification data cannot be shared among different users. Therefore, for data labeling of different application scenarios, a large amount of labor costs are wasted to label data, which seriously affects user experience.

SUMMARY

The present disclosure provides a comment information processing method and apparatus, and a medium.

Embodiments of the present disclosure provide a comment information processing method, including: in response to a user operation, determining an opinion category corresponding to each opinion phrase in a comment opinion dictionary; obtaining a target corpus matching with each opinion phrase from a plurality of comment corpora; for each opinion phrase, using the opinion category to label the target corpus to obtain a first training sample; and training a classification model with the first training sample, and identifying an opinion category of a comment by using the classification model.

Embodiments of the present disclosure provide a comment information processing apparatus, including: one or more processors; a memory storing instructions executable by the one or more processors; in which the one or more processors are configured to: in response to a user operation, determine an opinion category corresponding to each opinion phrase in a comment opinion dictionary; obtain a target corpus matching with each opinion phrase from a plurality of comment corpora; for each opinion phrase, use the opinion category to label the target corpus to obtain a first training sample; and train a classification model with the first training sample, and identify an opinion category of a comment by using the classification model.

Embodiments of the present disclosure provide a non-transitory computer-readable storage medium having a computer instruction stored thereon. The computer instruction is configured to cause a computer to implement a comment information processing method. The comment information processing method may include: in response to a user operation, determining an opinion category corresponding to each opinion phrase in a comment opinion dictionary; obtaining a target corpus matching with each opinion phrase from a plurality of comment corpora; for each opinion phrase, using the opinion category to label the target corpus to obtain a first training sample; and training a classification model with the first training sample, and identifying an opinion category of a comment by using the classification model.

Other effects of the above optional implementations will be described below in combination with specific embodiments.

BRIEF DESCRIPTION OF THE DRAWINGS

The accompanying drawings are used for a better understanding of the solution and do not constitute a limitation of the present disclosure.

DETAILED DESCRIPTION

The following describes exemplary embodiments of the present disclosure with reference to the accompanying drawings, and includes various details of embodiments of the present disclosure to facilitate understanding. The various details should be considered as merely exemplary. Therefore, a person skilled in the art should recognize that various changes and modifications may be made to embodiments described herein without departing from the scope and spirit of the present disclosure. Also, for clarity and conciseness, descriptions of well-known functions and structures are omitted in the following description.

The core application scenario of comment analysis is e-commerce comment analysis. However, comment analysis in e-commerce scenarios often faces various technical difficulties.

In a sub-task of comment opinion extraction, there are often problems of diverse dimensions and comment expressions. In addition, there are also problems of little trainable data and high labeling costs of samples. For the comment opinion extraction, when a comment opinion appears directly in a comment text, a user needs to label a position of the comment opinion of the comment text in an original text. For a latently-expressed comment opinion, the user needs to give a summative comment opinion after understanding the comment. For the sentiment classification of opinions, the user needs to label the sentiment polarity on the basis of a given comment opinion and an original comment. For the task of opinion classification, the user needs to continue to label an opinion category based on the above labeling. Consequently, it may be seen that a lot of manpower is required to construct massive and high-quality training data for opinion analysis, which seriously affects user experience.

To solve the technical problems in the related art, the present disclosure provides a comment information processing method. In response to a user operation, an opinion category corresponding to each opinion phrase in a comment opinion dictionary is determined. A target corpus matching with each opinion phrase is obtained from a plurality of comment corpora. For each opinion phrase, the opinion category is used to label the target corpus to obtain a first training sample. A classification model is trained with the first training sample, and an opinion category of a comment is identified by using the classification model. With the method, training samples may be generated by only labeling opinion categories corresponding to opinion phrases, which reduces the workload, and saves the labor costs to a certain extent.

A comment information processing method and apparatus, a computer device and a medium of the present disclosure will be described below with reference to the accompanying drawings.

Figure 1:
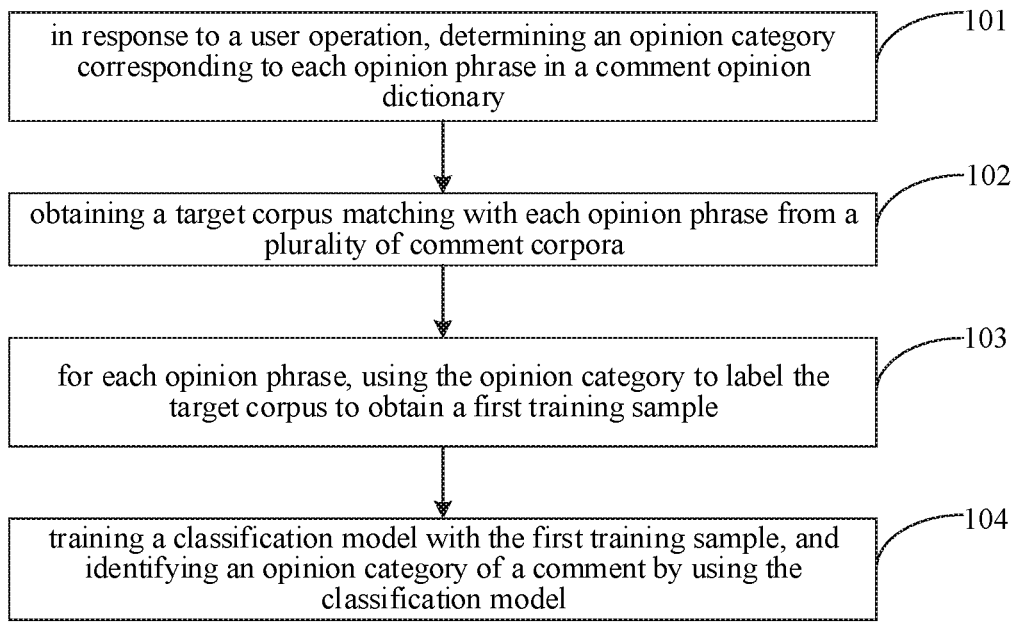
FIG. 1 is a flowchart of a comment information processing method according to an embodiment of the present disclosure.

FIG. 1 is a flowchart of a comment information processing method according to an embodiment of the present disclosure.

The embodiment of the present disclosure is exemplified by configuring the comment information processing method in the comment information processing apparatus. The comment information processing apparatus may be applied to any computer device, so that the computer device may perform a comment information processing function.

The computer device may be a personal computer (PC), a cloud device, a mobile device, and so on. The mobile device may be an intelligent device with an operating system, for example, a mobile phone, a tablet computer, a personal digital assistant, and a vehicle-mounted device.

As illustrated in FIG. 1, the comment information processing method may include the following steps.

At block 101, in response to a user operation, an opinion category corresponding to each opinion phrase in a comment opinion dictionary is determined.

It is understandable that the processing of comment information aims to automatically extract a label that may summarize an opinion of a user from the comment information. For example, the label may be output as a quaternion containing a dimension word, a comment word, a sentiment polarity, and an opinion category. For example, the comment information is "The concrete anchor installed was askew. The machine had a leakage problem. I had it repaired, but the cost was very high. The installer charged fees arbitrarily." The comment opinion may be extracted as "machine-leakage-negative-product", "cost-expensive-positive-maintenance", "installer-arbitrary charge-negative-installation", etc.

In the embodiment of the present disclosure, the opinion phrase may include a substantive word and a descriptive word. The opinion phrase may be a phrase composed of a dimension word, a comment word, and a sentiment polarity automatically mined from the comment information. For example, the opinion phrase may be "cost-expensive-negative", "installation-inferior-negative", and so on. The substantive words are "cost", "installation" and the like. The comment opinion dictionary is composed of comment opinion phrases mined from the comment information. Each opinion phrase in the comment opinion dictionary has a fixed collocation of emotion word. For example, the emotion word may be "negative", "positive", or the like.

It should be noted that the opinion phrase may be automatically extracted from a comment corpus in a manner of combining part-of-speech template matching and clustering normalization, or the opinion phrase may be automatically extracted from the comment information based on a deep neural network model or a topic model. The specific mining manner of the opinion phrase is not limited in the embodiment of the present disclosure.

In the embodiment of the present disclosure, phrase extraction may be performed, based on a preset extraction rule, on the plurality of comment corpora to obtain a plurality of candidate phrases. The plurality of candidate phrases may be filtered, based on an appearance frequency of each candidate phrase in the plurality of comment corpora, to obtain a plurality of comment opinion phrases.

For example, several candidate phrases with a high appearance frequency among the candidate phrases may be determined as the comment opinion phrases.

In the embodiment of the present disclosure, for each opinion phrase in the comment opinion dictionary, the user needs to manually label the opinion category corresponding to the opinion phrase, so that the computer device may, in response to the user operation, determine the opinion category corresponding to the opinion phrase in the comment opinion dictionary.

For example, when the user labels the opinion phrase "cost-expensive-negative" as maintenance, it may be determined that the opinion category corresponding to the opinion phrase is "maintenance". When the user labels the opinion phrase "installation-inferior-negative" as installation, it may be determined that the opinion category corresponding to the opinion phrase is "installation".

At block 102, a target corpus matching with each opinion phrase is obtained from a plurality of comment corpora.

The comment corpus may refer to the comment information of the user obtained from a server, that is, an original comment text of the user.

In the embodiment of the present disclosure, for the opinion phrase in the comment opinion dictionary, the target corpus matching with each opinion phrase is obtained from the plurality of comment corpora.

As a possible implementation, for each opinion phrase, the plurality of comment corpora may be filtered to obtain a plurality of candidate corpora containing the substantive word and the descriptive word in the opinion phrase. In response to the substantive word and the descriptive word in each of the plurality of candidate corpora appearing in a same short sentence, and a number of words between the substantive word and the descriptive word being smaller than a threshold, the candidate corpus is determined as the target corpus matching with the opinion phrase.

For example, the opinion phrase is "cost-expensive-negative". In the plurality of comment corpora obtained from comments of users, the plurality of candidate corpora containing the substantive word and the descriptive word in the opinion phrase may be obtained through filtering. And then, on the basis that the substantive word and the descriptive word in each of the plurality of candidate corpora appear in the same short sentence, and the number of words between the substantive word and the descriptive word is smaller than the threshold, it may be determined that the target corpus matching with the opinion phrase is "The concrete anchor installed was askew. The machine had a leakage problem. I had it repaired, but the cost was very high. The installer charged fees arbitrarily."

At block 103, for each opinion phrase, the opinion category is used to label the target corpus to obtain a first training sample.

In the embodiment of the present disclosure, after determining the opinion category corresponding to the opinion phrase in the comment opinion dictionary and the target corpus matching with the opinion phrase, for each opinion phrase in the comment opinion dictionary, the opinion category is used to label the target corpus to obtain the first training sample.

With continued reference to the above example, after determining that the opinion category corresponding to the opinion phrase "cost-expensive-negative" is "maintenance", the target corpus matching with the opinion phrase may be labeled, based on the opinion category corresponding to the opinion phrase, as "The concrete anchor installed was askew. The machine had a leakage problem. I had it repaired, but the cost was very high. The installer charged fees arbitrarily." Consequently, the training sample that has been labeled with the category of the opinion phrase is obtained.

In the embodiment of the present disclosure, the first training sample is named to distinguish other training samples, and includes the target corpus matching with the opinion phrase in the comment opinion dictionary. The target corpus matching with the opinion phrase is labeled with the opinion category of the opinion phrase.

At block 104, a classification model is trained with the first training sample, and an opinion category of a comment is identified by using the classification model.

In the embodiment of the present disclosure, after the first training sample is obtained, the classification model is trained with the first training sample, and the opinion category of the comment is identified by using the classification model.

With the comment information processing method according to the embodiment of the present disclosure, in response to the user operation, the opinion category corresponding to each opinion phrase in the comment opinion dictionary is determined. The target corpus matching with each opinion phrase is obtained from the plurality of comment corpora. For each opinion phrase, the opinion category is used to label the target corpus to obtain the first training sample. The classification model is trained with the first training sample, and the opinion category of the comment is identified by using the classification model. With the method, training samples may be generated simply by labeling opinion categories corresponding to opinion phrases, which solves a technical problem in the related art of a great waste of labor costs as the user needs to label all training samples for comments in different application scenarios. Consequently, the workload is reduced, and the labor costs are saved.

Figure 2:
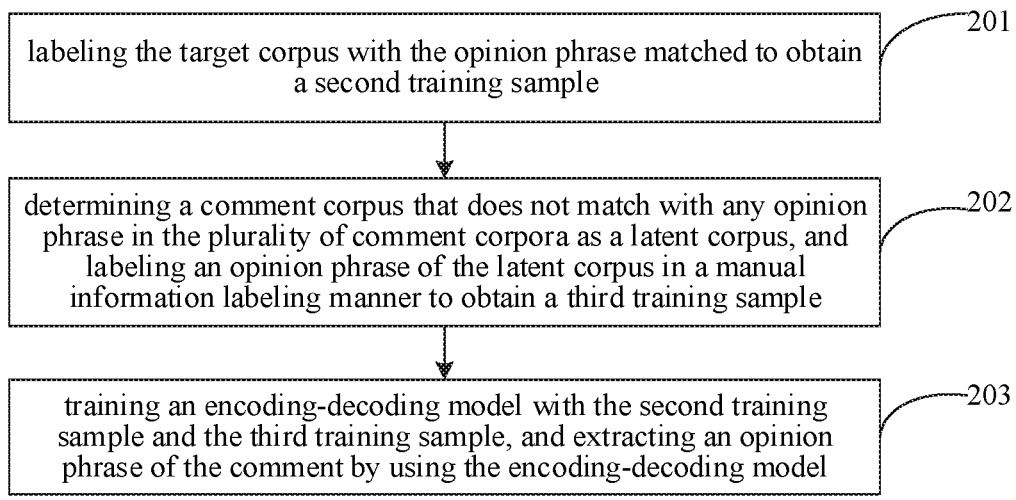
FIG. 2 is a flowchart of a comment information processing method according to another embodiment of the present disclosure.

On the basis of the above embodiment, after step 102 of obtaining the target corpus matching with each opinion phrase from the plurality of comment corpora, the target corpus may be labeled to obtain a second training sample. Manual labeling may be performed on a comment corpus that does not match with any opinion phrase in the plurality of comment corpora to obtain a third training sample. An encoding-decoding model may be trained with the second training sample and the third training sample, and an opinion phrase of the comment may be extracted by using the encoding-decoding model. The above process will be described in detail below in combination with FIG. 2. FIG. 2 is a flowchart of a comment information processing method according to another embodiment of the present disclosure.

As illustrated in FIG. 2, the comment information processing method may further include the following steps.

At block 201, the target corpus is labeled with the opinion phrase matched to obtain a second training sample.

At block 202, a comment corpus that does not match with any opinion phrase in the plurality of comment corpora is determined as a latent corpus, and an opinion phrase of the latent corpus is labeled in a manual information labeling manner to obtain a third training sample.

In a possible implementation, after obtaining the target corpus matching with each opinion phrase from the plurality of comment corpora, the target corpus is labeled with the opinion phrase matched to obtain the second training sample.

In another possible implementation, a comment corpus that does not match with any opinion phrase may exist in the plurality of comment corpora. Consequently, the comment corpus that does not match with any opinion phrase in the comment opinion dictionary in the plurality of comment corpora is determined as the latent corpus, and the opinion phrase of the latent corpus is labeled in the manual information labeling manner to obtain the third training sample.

The latent corpus refers to a comment text that expresses an opinion of a user implicitly, instead of intuitively including a substantive word and a descriptive word.

For example, the comment corpus is "I doubt that it is not for humans". The comment corpus does not match with any opinion phrase in the comment opinion dictionary, and thus the opinion phrase of the comment corpus may be manually labeled as "taste-bad-negative".

It should be noted that an opinion phrase of a comment corpus that does not match with any opinion phrase in the plurality of comment corpora is labeled in the manual information labeling manner. In order to facilitate the distinction from the above training text, the latent corpus labeled with the opinion phrase is described as the third training sample.

At block 203, an encoding-decoding model is trained with the second training sample and the third training sample, and an opinion phrase of the comment is extracted by using the encoding-decoding model.

In the embodiment of the present disclosure, the encoding-decoding model includes an encoder and a decoder. The encoder is configured to perform semantic encoding on the comment to obtain a hidden state vector of the comment. The decoder is configured to decode the hidden state vector to output the opinion phrase of the comment. The decoder has learned a mapping relationship between the hidden state vector and the opinion phrase. Consequently, after inputting the comment into the encoding-decoding model, the opinion phrase of the comment may be accurately extracted.

The hidden state vector is used to indicate the semantic meaning and the context of the comment. Semantic encoding is to process information into words, classify the words based on meaning or system, or to organize and summarize the speech materials in the language form of the user to find out basic contentions, arguments, and logical structures of the materials, and thus the speech materials are encoded based on semantic features.

In natural language processing, a natural language text is a sequence of text of indefinite length composed of symbols spliced sequentially, which is difficult to be directly converted into numerical data that may be understood by a computer, and cannot be directly processed by the computer. The hidden state vector contains rich information, so deep learning may handle most natural language processing applications.

It should be noted that there are many ways to perform voice encoding on the comment through the encoder to generate the hidden state vector of the comment. For example, a bi-directional long short-term memory (BiLSTM), self-attention mechanism, convolutional neural network (CNN), and so on. In the embodiment of the present disclosure, there is no limitation on the encoding technology used by the encoder.

In the embodiment of the present disclosure, after obtaining the second training sample and the third training sample, the second training sample and the third training sample are used to train the encoding-decoding model, so as to extract the opinion phrase of the comment by using the encoding-decoding model. Therefore, after inputting the comment into the encoding-decoding model, the opinion phrase of the comment may be accurately extracted.

With the comment information processing method of the embodiment of the present disclosure, the target corpus is labeled with the opinion phrase matched to obtain the second training sample. The comment corpus that does not match with any opinion phrase in the plurality of comment corpora is determined as the latent corpus, and the opinion phrase of the latent corpus is labeled in the manual information labeling manner to obtain the third training sample. The encoding-decoding model is trained with the second training sample and the third training sample, and the opinion phrase of the comment is extracted by using the encoding-decoding model. Therefore, after the comment is inputted into the encoding-decoding model, the opinion phrase may be accurately extracted, thereby maximizing a recall rate of the opinion.

Figure 3:
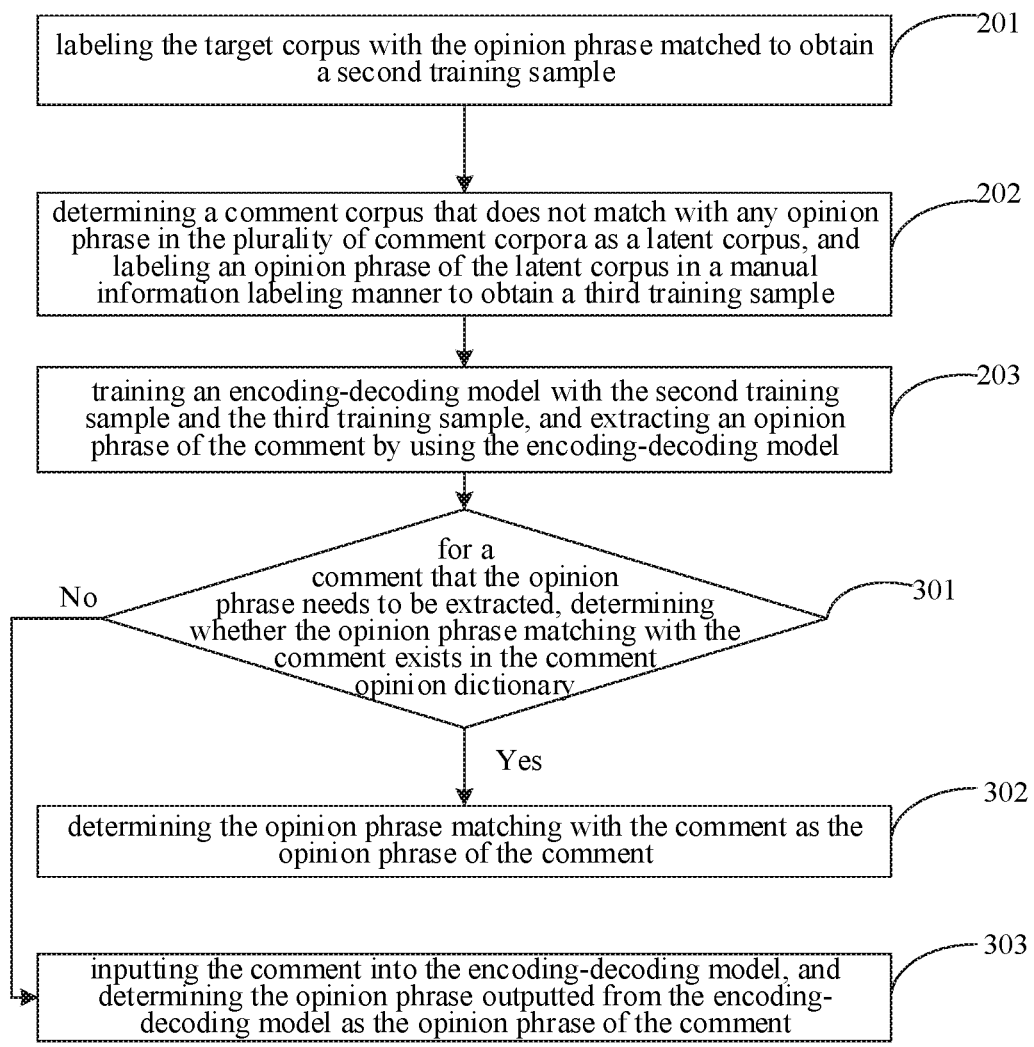
FIG. 3 is a flowchart of a comment information processing method according to yet another embodiment of the present disclosure.

On the basis of the above embodiment, for the comment that the opinion phrase needs to be extracted, it may be determined whether the opinion phrase exists in the comment opinion dictionary, so as to determine whether the comment needs to be inputted into the encoding-decoding model. The above process will be described in detail below in combination with FIG. 3. FIG. 3 is a flowchart of a comment information processing method according to yet another embodiment of the present disclosure.

As illustrated in FIG. 3, the comment information processing method may further include the following steps.

At block 301, for a comment that the opinion phrase needs to be extracted, it is determined whether the opinion phrase matching with the comment exists in the comment opinion dictionary.

In the embodiment of the present disclosure, for the comment that the opinion phrase needs to be extracted, it is first determined whether the opinion phrase matching with the comment exists in the comment opinion dictionary.

It should be noted that when the substantive word and the descriptive word in the opinion phrase appear in the same short sentence of the comment that the opinion phrase needs to be extracted, and the number of words between the substantive word and the descriptive word is less than the threshold, the opinion phrase is determined to be matching with the comment that the opinion phrase needs to be extracted.

At block 302, in response to that the opinion phrase matching with the comment exists in the comment opinion dictionary, the opinion phrase matching with the comment is determined as the opinion phrase of the comment.

In a possible implementation, when the opinion phrase matching with the comment that the opinion phrase needs to be extracted exists in the comment opinion dictionary, the opinion phrase matching with the comment is determined as the opinion phrase of the comment.

For example, the comment that the opinion phrase needs to be extracted is "The concrete anchor installed was askew. The machine had a leakage problem. I had it repaired, but the cost was very high. The installer charged fees arbitrarily." If the opinion phrase, "cost-expensive-negative", matching with the comment exists in the comment opinion dictionary, "cost-expensive-negative" is determined as the opinion phrase of the comment.

It should be noted that each opinion phrase in the comment opinion dictionary has a fixed collocation of emotion word. As a possible implementation, after the opinion phrase matching with the comment is determined as the opinion phrase of the comment, an emotional tendency of the comment may be determined based on the fixed collocation of emotion word of the opinion phrase matching with the comment.

Taking the above example as an example, after determining that the fixed collocation of emotion word matching with the opinion phrase is "negative", it may be determined that the emotional tendency of the comment is also "negative".

As another possible implementation, an emotion classification model may also be used to identify the emotional tendency of the comment. The emotion classification model may be a classification model for general scenarios. By performing migration learning based on a small number of manually labeled training samples in a specific scenario, the emotion classification model for the specific scenario is obtained.

At block 303, in response to that the opinion phrase matching with the comment does not exist in the comment opinion dictionary, the comment is inputted into the encoding-decoding model, and the opinion phrase outputted from the encoding-decoding model is determined as the opinion phrase of the comment.

In another possible implementation, when the opinion phrase matching with the comment that the opinion phrase needs to be extracted does not exist in the comment opinion dictionary, the comment is inputted into the encoding-decoding model, and the opinion phrase outputted from the encoding-decoding model is determined as the opinion phrase of the comment.

It may be understood that if the comment is the latent corpus, the opinion phrase matching with the comment that the opinion phrase needs to be extracted does not exist in the comment opinion dictionary. In this case, the comment may be input into the encoding-decoding model, and then the opinion phrase output from the encoding-decoding model is determine as the opinion phrase of the comment.

With the comment information processing method of the embodiment of the present disclosure, for the comment that the opinion phrase needs to be extracted, it is determined whether the opinion phrase matching with the comment exists in the comment opinion dictionary. In response to that the opinion phrase matching with the comment exists in the comment opinion dictionary, the opinion phrase matching with the comment is determined as the opinion phrase of the comment. In response to that the opinion phrase matching with the comment does not exist in the comment opinion dictionary, the comment is inputted into the encoding-decoding model, and the opinion phrase outputted from the encoding-decoding model is determined as the opinion phrase of the comment. Therefore, for the problem of diversity of comment texts, a recall rate of opinion phrases may be maximized to meet needs of users in different application scenarios.

To implement the above embodiments, the present disclosure provides a comment information processing apparatus.

Figure 4:
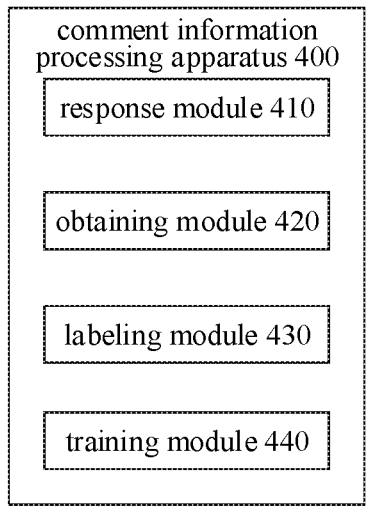
FIG. 4 is a schematic diagram of a comment information processing apparatus according to an embodiment of the present disclosure.

FIG. 4 is a schematic diagram of a comment information processing apparatus according to an embodiment of the present disclosure.

As illustrated in FIG. 4, a comment information processing apparatus 400 may include a response module 410, an obtaining module 420, a labeling module 430 and a training module 440. The response module 410 is configured to, in response to a user operation, determine an opinion category corresponding to each opinion phrase in a comment opinion dictionary. The obtaining module 420 is configured to obtain a target corpus matching with each opinion phrase from a plurality of comment corpora. The labeling module 430 is configured to, for each opinion phrase, use the opinion category to label the target corpus to obtain a first training sample. The training module 440 is configured to train a classification model with the first training sample, and to identify an opinion category of a comment by using the classification model.

As a possible implementation, each opinion phrase includes a substantive word and a descriptive word. The obtaining module 420 is configured to: for each opinion phrase, filter the plurality of comment corpora to obtain a candidate corpus containing the substantive word and the descriptive word in the opinion phrase; and in response to the substantive word and the descriptive word in the candidate corpus appearing in a same short sentence, and a number of words between the substantive word and the descriptive word being smaller than a threshold, determine the candidate corpus as the target corpus matching with the opinion phrase.

As a possible implementation, the labeling module 430 is configured to label the target corpus with the opinion phrase matched to obtain a second training sample; and to determine a comment corpus that does not match with any opinion phrase in the plurality of comment corpora as a latent corpus, and to label an opinion phrase of the latent corpus in a manual information labeling manner to obtain a third training sample.

The training module 440 is further configured to train an encoding-decoding model with the second training sample and the third training sample, and to extract an opinion phrase of the comment by using the encoding-decoding model.

As a possible implementation, the encoding-decoding model includes an encoder and a decoder. The encoder is configured to perform semantic encoding on the comment to obtain a hidden state vector of the comment. The decoder is configured to decode the hidden state vector to output the opinion phrase of the comment. The decoder has learned a mapping relationship between the hidden state vector and the opinion phrase.

As a possible implementation, the comment information processing apparatus 400 may further include a processing module. The processing module is configured to, for a comment that the opinion phrase needs to be extracted, determine whether the opinion phrase matching with the comment exists in the comment opinion dictionary. In response to that the opinion phrase matching with the comment exists in the comment opinion dictionary, the opinion phrase matching with the comment is determined as the opinion phrase of the comment. In response to that the opinion phrase matching with the comment does not exist in the comment opinion dictionary, the comment is inputted into the encoding-decoding model, and the opinion phrase outputted from the encoding-decoding model is determined as the opinion phrase of the comment.

As a possible implementation, each opinion phrase in the comment opinion dictionary has a fixed collocation of emotion word. The comment information processing apparatus 400 may further include a determination module. The determination module is configured to determine an emotional tendency of the comment based on the fixed collocation of emotion word of the opinion phrase matching with the comment.

As a possible implementation, the comment information processing apparatus 400 may further include an extraction module and a filtering module. The extraction module is configured to perform, based on a preset extraction rule, phrase extraction on the plurality of comment corpora to obtain a plurality of candidate phrases. The filtering module is configured to filter, based on an appearance frequency of each candidate phrase in the plurality of comment corpora, the plurality of candidate phrases to obtain a plurality of comment opinion phrases.

It should be noted that the above description of the comment information processing method is also applicable to the comment information processing apparatus, which will not be described herein.

With the comment information processing apparatus according to the embodiment of the present disclosure, in response to the user operation, the opinion category corresponding to each opinion phrase in the comment opinion dictionary is determined. The target corpus matching with each opinion phrase is obtained from the plurality of comment corpora. For each opinion phrase, the opinion category is used to label the target corpus to obtain the first training sample. The classification model is trained with the first training sample, and the opinion category of the comment is identified by using the classification model. With the method, training samples may be generated simply by labeling opinion categories corresponding to opinion phrases, which solves a technical problem in the related art of a great waste of labor costs as the user needs to label all training samples for comments in different application scenarios. Consequently, the workload is reduced, and the labor costs are saved.

According to embodiments of the present disclosure, a computer device and a readable storage medium are further provided.

Figure 5:
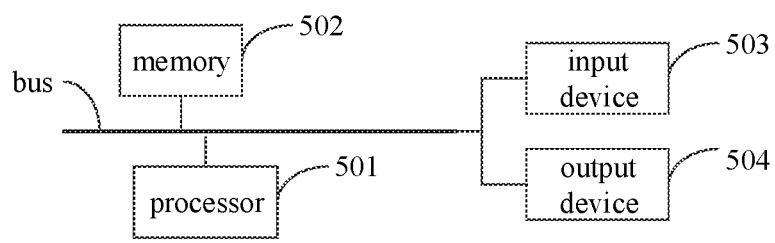
FIG. 5 is a block diagram of a computer device configured to implement a comment information processing method according to an embodiment of the present disclosure.

FIG. 5 is a block diagram of a computer device configured to implement a comment information processing method according to an embodiment of the present disclosure. The computer device is intended to represent various forms of digital computers, such as a laptop computer, a desktop computer, a workbench, a personal digital assistant, a server, a blade server, a mainframe computer and other suitable computers. The computer device may also represent various forms of mobile devices, such as a personal digital processor, a cellular phone, a smart phone, a wearable device and other similar computing devices. Components shown herein, their connections and relationships as well as their functions are merely examples, and are not intended to limit the implementation of the present disclosure described and/or required herein.

As illustrated in FIG. 5, the computer device includes: one or more processors 501, a memory 502, and interfaces for connecting various components, including a high-speed interface and a low-speed interface. The components are interconnected by different buses and may be mounted on a common motherboard or otherwise installed as required. The processor may process instructions executed within the computer device, including instructions stored in or on the memory to display graphical information of the GUI on an external input/output device (such as a display device coupled to the interface). In other embodiments, when necessary, multiple processors and/or multiple buses may be used with multiple memories. Similarly, multiple computer devices may be connected, each providing some of the necessary operations (for example, as a server array, a group of blade servers, or a multiprocessor system). One processor 501 is taken as an example in FIG. 5.

The memory 502 is a non-transitory computer-readable storage medium according to the embodiments of the present disclosure. The memory stores instructions executable by at least one processor, so that the at least one processor executes the comment information processing method according provided by the present disclosure. The non-transitory computer-readable storage medium according to the present disclosure stores computer instructions, which are configured to make the computer execute the comment information processing method provided by the present disclosure.

As a non-transitory computer-readable storage medium, the memory 502 may be configured to store non-transitory software programs, non-transitory computer executable programs and modules, such as program instructions/modules (for example, the response module 410, the obtaining module 420, the labeling module 430 and the training module 440 illustrated in FIG. 4) corresponding to the comment information processing method according to the embodiment of the present disclosure. The processor 501 executes various functional applications and performs data processing of the server by running non-transitory software programs, instructions and modules stored in the memory 502, that is, the comment information processing method according to the foregoing method embodiments is implemented.

The memory 502 may include a storage program area and a storage data area, where the storage program area may store an operating system and applications required for at least one function; and the storage data area may store data created based on the use of the computer device that implements the comment information processing method, and the like. In addition, the memory 502 may include a high-speed random access memory, and may further include a non-transitory memory, such as at least one magnetic disk memory, a flash memory device, or other non-transitory solid-state memories. In some embodiments, the memory 502 may optionally include memories remotely disposed with respect to the processor 501, and these remote memories may be connected to the computer device, which is configured to implement the comment information processing method, through a network. Examples of the network include, but are not limited to, the Internet, an intranet, a local area network, a mobile communication network, and combinations thereof.

The computer device configured to implement the comment information processing method may further include an input device 503 and an output device 504. The processor 501, the memory 502, the input device 503 and the output device 504 may be connected through a bus or in other manners. FIG. 5 is illustrated by establishing the connection through a bus.

The input device 503 may receive input numeric or character information, and generate key signal inputs related to user settings and function control of the computer device configured to implement the comment information processing method according to the embodiments of the present disclosure, such as a touch screen, a keypad, a mouse, a trackpad, a touchpad, a pointing stick, one or more mouse buttons, trackballs, joysticks and other input devices. The output device 504 may include a display device, an auxiliary lighting device (for example, an LED), a haptic feedback device (for example, a vibration motor), and so on. The display device may include, but is not limited to, a liquid crystal display (LCD), a light emitting diode (LED) display and a plasma display. In some embodiments, the display device may be a touch screen.

Various implementations of systems and technologies described herein may be implemented in digital electronic circuit systems, integrated circuit systems, application-specific ASICs (application-specific integrated circuits), computer hardware, firmware, software, and/or combinations thereof. These various implementations may include: being implemented in one or more computer programs that are executable and/or interpreted on a programmable system including at least one programmable processor. The programmable processor may be a dedicated or general-purpose programmable processor that may receive data and instructions from a storage system, at least one input device and at least one output device, and transmit the data and instructions to the storage system, the at least one input device and the at least one output device.

These computing programs (also known as programs, software, software applications, or codes) include machine instructions of a programmable processor, and may implement these calculation procedures by utilizing high-level procedures and/or object-oriented programming languages, and/or assembly/machine languages. As used herein, terms "machine-readable medium" and "computer-readable medium" refer to any computer program product, device and/or apparatus configured to provide machine instructions and/or data to a programmable processor (for example, a magnetic disk, an optical disk, a memory and a programmable logic device (PLD)), and includes machine-readable media that receive machine instructions as machine-readable signals. The term "machine-readable signals" refers to any signal used to provide machine instructions and/or data to a programmable processor.

In order to provide interactions with the user, the systems and technologies described herein may be implemented on a computer having: a display device (for example, a cathode ray tube (CRT) or a liquid crystal display (LCD) monitor) for displaying information to the user; and a keyboard and a pointing device (such as a mouse or trackball) through which the user may provide input to the computer. Other kinds of devices may also be used to provide interactions with the user; for example, the feedback provided to the user may be any form of sensory feedback (e.g., visual feedback, auditory feedback or haptic feedback); and input from the user may be received in any form (including acoustic input, voice input or tactile input).

The systems and technologies described herein may be implemented in a computing system that includes back-end components (for example, as a data server), a computing system that includes middleware components (for example, an application server), or a computing system that includes front-end components (for example, a user computer with a graphical user interface or a web browser, through which the user may interact with the implementation of the systems and technologies described herein), or a computing system including any combination of the back-end components, the middleware components or the front-end components. The components of the system may be interconnected by digital data communication (e.g., a communication network) in any form or medium. Examples of the communication network include: a local area network (LAN), a wide area network (WAN), and the Internet.

Computer systems may include a client and a server. The client and server are generally remote from each other and typically interact through the communication network. A client-server relationship is generated by computer programs running on respective computers and having a client-server relationship with each other.

With the technical solution according to embodiments of the present disclosure, in response to the user operation, the opinion category corresponding to each opinion phrase in the comment opinion dictionary is determined. The target corpus matching with each opinion phrase is obtained from the plurality of comment corpora. For each opinion phrase, the opinion category is used to label the target corpus to obtain the first training sample. The classification model is trained with the first training sample, and the opinion category of the comment is identified by using the classification model. With the method, training samples may be generated simply by labeling opinion categories corresponding to opinion phrases, which solves a technical problem in the related art of a great waste of labor costs as the user needs to label all training samples for comments in different application scenarios. Consequently, the workload is reduced, and the labor costs are saved.

It should be understood that various forms of processes shown above may be reordered, added or deleted. For example, the blocks described in the present disclosure may be executed in parallel, sequentially, or in different orders. As long as the desired results of the technical solution disclosed in the present disclosure may be achieved, there is no limitation herein.

The foregoing specific implementations do not constitute a limit on the protection scope of the present disclosure. It should be understood by those skilled in the art that various modifications, combinations, sub-combinations and substitutions may be made according to design requirements and other factors. Any modification, equivalent replacement and improvement made within the spirit and principle of the present disclosure shall be included in the protection scope of the present disclosure.

What is claimed is:

1. A comment information processing method, comprising:
    in response to a user operation, determining an opinion category corresponding to each opinion phrase in a comment opinion dictionary;
    obtaining a target corpus matching with each opinion phrase from a plurality of comment corpora;
    labeling the target corpus with the opinion phrase matched to obtain a second training sample;
    determining a comment corpus that does not match with any opinion phrase in the plurality of comment corpora as a latent corpus, and labeling an opinion phrase of the latent corpus in a manual information labeling manner to obtain a third training sample; and
    training an encoding-decoding model with the second training sample and the third training sample, and extracting an opinion phrase of the comment by using the encoding-decoding model;
    for a comment that the opinion phrase needs to be extracted, determining whether the opinion phrase matching with the comment exists in the comment opinion dictionary;
    in response to that the opinion phrase matching with the comment exists in the comment opinion dictionary, determining the opinion phrase matching with the comment as the opinion phrase of the comment; and
    in response to that the opinion phrase matching with the comment does not exist in the comment opinion dictionary, inputting the comment into the encoding-decoding model, and determining the opinion phrase outputted from the encoding-decoding model as the opinion phrase of the comment;
    for each opinion phrase, using the opinion category to label the target corpus to obtain a first training sample; and
    training a classification model with the first training sample, and identifying an opinion category of a comment by using the classification model.

2. The method of claim 1, wherein each opinion phrase comprises a substantive word and a descriptive word; and obtaining the target corpus matching with each opinion phrase from the plurality of comment corpora comprises:
    for each opinion phrase, filtering the plurality of comment corpora to obtain a candidate corpus containing the substantive word and the descriptive word in the opinion phrase; and
    in response to the substantive word and the descriptive word in the candidate corpus appearing in a same short sentence, and a number of words between the substantive word and the descriptive word being smaller than a threshold, determining the candidate corpus as the target corpus matching with the opinion phrase.

3. The method of claim 1, wherein the encoding-decoding model comprises an encoder and a decoder;
    wherein the encoder is configured to perform semantic encoding on the comment to obtain a hidden state vector of the comment; and
    the decoder is configured to decode the hidden state vector to output the opinion phrase of the comment, wherein the decoder has learned a mapping relationship between the hidden state vector and the opinion phrase.

4. The method of claim 1, wherein each opinion phrase in the comment opinion dictionary has a fixed collocation of emotion word; and
    after the opinion phrase matching with the comment is determined as the opinion phrase of the comment, the method further comprises:
    determining an emotional tendency of the comment based on the fixed collocation of emotion word of the opinion phrase matching with the comment.

5. The method of claim 1, before determining the opinion category corresponding to each opinion phrase in the comment opinion dictionary in response to the user operation, further comprising:
    performing, based on a preset extraction rule, phrase extraction on the plurality of comment corpora to obtain a plurality of candidate phrases; and
    filtering, based on an appearance frequency of each candidate phrase in the plurality of comment corpora, the plurality of candidate phrases to obtain a plurality of comment opinion phrases.

6. A comment information processing apparatus, comprising:
one or more processors;
a memory storing instructions executable by the one or more processors;
wherein the one or more processors are configured to:
in response to a user operation, determine an opinion category corresponding to each opinion phrase in a comment opinion dictionary;
obtain a target corpus matching with each opinion phrase from a plurality of comment corpora;
for each opinion phrase, use the opinion category to label the target corpus to obtain a first training sample; and
train a classification model with the first training sample, and identify an opinion category of a comment by using the classification model,
the one or more processors are configured to label the target corpus with the opinion phrase matched to obtain a second training sample; and to determine a comment corpus that does not match with any opinion phrase in the plurality of comment corpora as a latent corpus, and to label an opinion phrase of the latent corpus in a manual information labeling manner to obtain a third training sample; and
the one or more processors are configured to train an encoding-decoding model with the second training sample and the third training sample, and to extract an opinion phrase of the comment by using the encoding-decoding model,
the one or more processors are configured to:
for a comment that the opinion phrase needs to be extracted, determine whether the opinion phrase matching with the comment exists in the comment opinion dictionary;
in response to that the opinion phrase matching with the comment exists in the comment opinion dictionary, determine the opinion phrase matching with the comment as the opinion phrase of the comment; and
in response to that the opinion phrase matching with the comment does not exist in the comment opinion dictionary, input the comment into the encoding-decoding model, and determine the opinion phrase outputted from the encoding-decoding model as the opinion phrase of the comment.

7. The apparatus of claim 6, wherein each opinion phrase comprises a substantive word and a descriptive word; and the one or more processors are configured to:
for each opinion phrase, filter the plurality of comment corpora to obtain a candidate corpus containing the substantive word and the descriptive word in the opinion phrase; and
in response to the substantive word and the descriptive word in the candidate corpus appearing in a same short sentence, and a number of words between the substantive word and the descriptive word being smaller than a threshold, determine the candidate corpus as the target corpus matching with the opinion phrase.

8. The apparatus of claim 6, wherein
the encoding-decoding model comprises an encoder and a decoder;
wherein the encoder is configured to perform semantic encoding on the comment to obtain a hidden state vector of the comment; and
the decoder is configured to decode the hidden state vector to output the opinion phrase of the comment, wherein the decoder has learned a mapping relationship between the hidden state vector and the opinion phrase.

9. The apparatus of claim 6, wherein each opinion phrase in the comment opinion dictionary has a fixed collocation of emotion word; and the one or more processors are configured to:
determine an emotional tendency of the comment based on the fixed collocation of emotion word of the opinion phrase matching with the comment..

10. The apparatus of claim 6, wherein the one or more processors are configured to:
perform, based on a preset extraction rule, phrase extraction on the plurality of comment corpora to obtain a plurality of candidate phrases; and
filter, based on an appearance frequency of each candidate phrase in the plurality of comment corpora, the plurality of candidate phrases to obtain a plurality of comment opinion phrases.

11. A non-transitory computer-readable storage medium having a computer instruction stored thereon, wherein the computer instruction is configured to cause a computer to implement a comment information processing method, wherein the method comprises:
in response to a user operation, determining an opinion category corresponding to each opinion phrase in a comment opinion dictionary;
obtaining a target corpus matching with each opinion phrase from a plurality of comment corpora;
labeling the target corpus with the opinion phrase matched to obtain a second training sample;
determining a comment corpus that does not match with any opinion phrase in the plurality of comment corpora as a latent corpus, and labeling an opinion phrase of the latent corpus in a manual information labeling manner to obtain a third training sample; and
training an encoding-decoding model with the second training sample and the third training sample, and extracting an opinion phrase of the comment by using the encoding- decoding model;
for a comment that the opinion phrase needs to be extracted, determining whether the opinion phrase matching with the comment exists in the comment opinion dictionary;
in response to that the opinion phrase matching with the comment exists in the comment opinion dictionary, determining the opinion phrase matching with the comment as the opinion phrase of the comment; and
in response to that the opinion phrase matching with the comment does not exist in the comment opinion dictionary, inputting the comment into the encoding-decoding model, and determining the opinion phrase outputted from the encoding-decoding model as the opinion phrase of the comment;
for each opinion phrase, using the opinion category to label the target corpus to obtain a first training sample; and
training a classification model with the first training sample, and identifying an opinion category of a comment by using the classification model.

* * * * *